United States Patent [19]
Gengenbach

[11] Patent Number: 5,706,583
[45] Date of Patent: Jan. 13, 1998

[54] TWIN UTILITY HACKSAW BLADE

[76] Inventor: Robert J. Gengenbach, 23 Crestview Dr., Somers, Conn. 06071

[21] Appl. No.: 673,685

[22] Filed: Jun. 25, 1996

[51] Int. Cl.⁶ .......................... B27B 33/10; B23D 63/00
[52] U.S. Cl. ........................ 30/166.3; 30/355; 83/835; 76/112
[58] Field of Search .................... 30/106.3, 346, 30/351, 355, 506, 509; 76/112; 83/835

[56] References Cited

U.S. PATENT DOCUMENTS

| | | | |
|---|---|---|---|
| 1,368,441 | 2/1921 | Kleinman | 83/835 |
| 1,882,328 | 10/1932 | Kinkel | 30/166.3 |
| 2,045,105 | 6/1936 | Salvador | 30/355 |
| 3,448,518 | 6/1969 | Sklar | 30/162 |

FOREIGN PATENT DOCUMENTS

| | | | |
|---|---|---|---|
| 637348 | 10/1936 | Germany | 30/507 |
| 94173 | 1/1939 | Switzerland | 30/166.3 |
| 1169428 | 11/1969 | United Kingdom | 30/166.3 |

*Primary Examiner*—Hwei-Siu Payer
*Attorney, Agent, or Firm*—Fishman, Dionne, Cantor & Colburn

[57] ABSTRACT

A dual utility hacksaw blade includes additional mounting through holes. The first set of holes (outer) being the mounting holes for the use of the saw as a conventional hacksaw and the second set of holes being initially pilot holes to be enlarged by the end user when the second utility is desired. The method of the invention also recommends enlarging the first set of holes for mounting in the reciprocating saw as the second utility. Additionally, the blade may include construction facilitating breakage of the hacksaw at predetermined areas and in predetermined angles to provide the second utility. The hacksaw may also simply, and preferably, be cut or broken off for the second utility.

15 Claims, 2 Drawing Sheets

5,706,583

TWIN UTILITY HACKSAW BLADE

BACKGROUND OF THE INVENTION

Hacksaws have been known for an extended number of years, and for at least a substantial portion thereof a standard design of hacksaw has been employed. As one of skill in the art will undoubtedly recognize, a hacksaw blade generally comprises a flexible metal band having sharp directional teeth arranged in and out of the band-plane in a sinuous manner on one edge thereof and a mounting hole at each of two ends of the band. The band or body is generally about one-half inch wide and 0.025 inches thick. Frames for hacksaw blades have been developed and redeveloped to produce a plethora of distinct types ranging from notched frames to threaded wheel tightening systems to single ended grips. Each is effective and is, therefore, preferred by one or another group of consumers. Through the extensive development of hacksaw frames over the years however, the blade itself has remained substantially constant.

Hacksaw blades in use provide a certain number of inches of cutting surface. While some blades are small and some are longer (blades of about 14 inches are now available), the most common size blade is 12 inches in length. While the blade is intended to provide a substantially similarly dimensioned stroke, users nearly invariably do not exceed four to six inches of stroke. Thus, when the blade has been employed for a sufficient period of time to expend its useful life, only a central four to six inches are dull. The remaining three to four inches on either end of the blade are unused. This is because of either small working spaces or that the frame of the hacksaw limits movement in some way. In any event, conventional blades provide no use for the unused portion of the blade. The blade is merely discarded, adding unnecessarily to landfill volume.

SUMMARY OF THE INVENTION

The above-discussed and other drawbacks and deficiencies of the prior art are overcome or alleviated by the dual utility blade of the invention.

The present invention provides utility for the three to four inch end sections of the otherwise expended hacksaw blade by providing additional mounting through holes and structure capable of being sheared at predetermined locations and angles or simply being cut or broken off at the desired angle and position. By carefully orienting and positioning the holes at each end of the blade it is possible to retain the function of the blade with respect to conventional hacksaw frames yet add the utility of providing one blade having teeth angled in the preferred direction for cutting for use in a reciprocating saw and one blade having teeth in the other direction. Simply by cutting the blade with snips, breaking the blade by hand or shearing the main blade along predetermined shearing planes, the unexpended end portions of the main blade are detachable. It will be appreciated by one of skill in the art that only one end of the blade is preferred due to tooth direction but both may be used if necessary (where the end with reversed tooth direction is employed, saw chatter will be experienced). Because of the additional mounting structure, and subsequent to the user enlarging both the hacksaw mounting hole and the pilot hole on the end of the hacksaw to be employed, a dual utility blade is created. The new blade is now easily mountable in a reciprocating saw as set forth hereunder. It will be appreciated that a larger reciprocating saw blade may be desired. And although such a longer blade will encompass part of the worn section of the hacksaw blade, generally use by hand is more difficult and the wear which renders the hacksaw expended does not so do where the higher speed and pressure of a reciprocating saw is in use. Thus, the invention provides additional utility for a hacksaw blade at low cost and additionally is a positive step toward reducing waste sent to landfills.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

For brevity, the blade as illustrated contains the through bore positioning of the invention on both ends of the hacksaw blade. This provides for a dual utility reciprocating saw blade with teeth extending in either direction. it will be appreciated that teeth extending toward the reciprocating saw are preferred and that a single side of the standard hacksaw may be modified by the teachings of this disclosure rather than both sides as illustrated.

Figure 1:
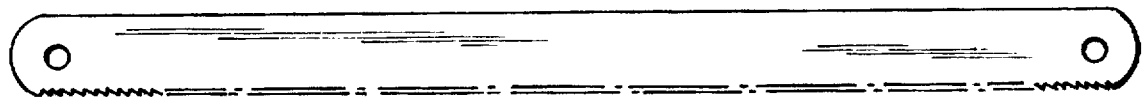
FIG. 1 is an illustration of a prior art hacksaw blade.
Figure 2:
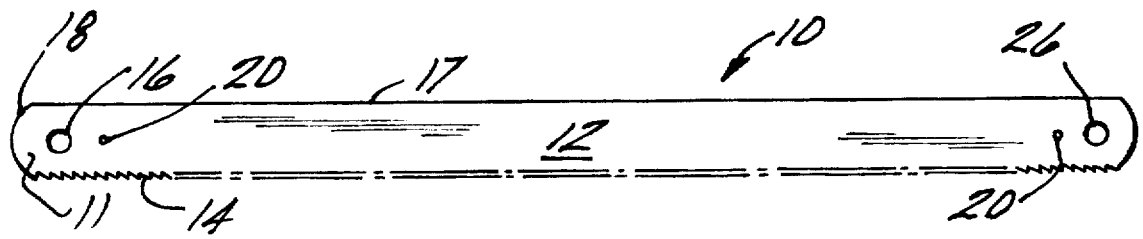
FIG. 2 is an illustration of a hacksaw blade of the invention.

Referring to FIG. 2, a hacksaw blade of the invention is illustrated. The blade 10 comprises an elongated body section 12 having a toothed edge 14 on one elongated edge and a flat edge 17 on the other elongated edge. It will be appreciated that toothed edge 14 extends completely along one elongated edge. Blade 10 further comprises four apertures positioned two on each of a first end 11 and second end 13.

Considering the first end, which is representative of both ends, each being a mirror image of the other, a first aperture 16 is preferably located about 15/64 inch from the first end edge 18 of the blade and about 15/64 inch from toothed edge 14, measured perpendicularly therefrom. This aperture 16 and its mirror image 26 on the opposite end of blade 10 is the primary mounting aperture for conventional use of the hacksaw. Aperture 16 is most commonly about 5/32 inch in diameter. Referring again to first end 11, a second aperture 20 positioned preferably about 31/64 inch from edge 18 and substantially centrally between edge 14 and edge 17. Aperture 20 is a pilot hole provided in the blade to promote easy drilling out thereof by an end user and to ensure proper location of the hole for mounting in the reciprocating saw. While it is possible for the manufacturer to provide aperture 20 of a sufficient dimension for end use it has been found that the torsional strength of the blade in the hacksaw utility is compromised thus rendering preferred the pilot hole embodiment. Assuming that the preferred embodiment is manufactured, the end user must merely drill out the pilot hole to a dimension in the range of about 9/64–11/64 with a dimension of about 5/32 being preferred. Aperture 16 is then drilled out (16') to a dimension in the range of about 13/64 to about 15/64, about 7/32 being preferred. This is to allow through passage of machine screw of reciprocating saw mounting bracket( both conventional and not shown). It is to be noted that some brands of reciprocating saws require that the aperture 16' be offset toward the toothed edge leaving approximately 1/32 inch of material between said toothed edge and the aperture 16'. Other brands do not require such offsetting. It is also critical to maintain sufficient material between aperture 16' and 20' to accommodate forceful movements of the blade back and forth in a reciprocating saw without breaking or bending beyond usefulness. The second aperture 20' in conjunction with the first aperture 16' permit engagement with a standard reciprocating saw.

Figure 3:
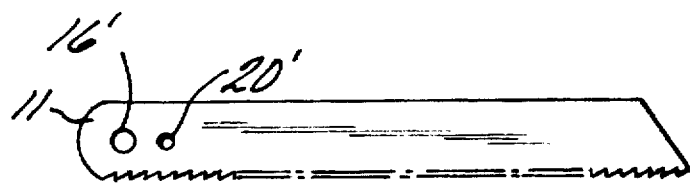
FIG. 3 is an illustration of the second blade product after separation and as connected to a reciprocating saw.
Figure 4:
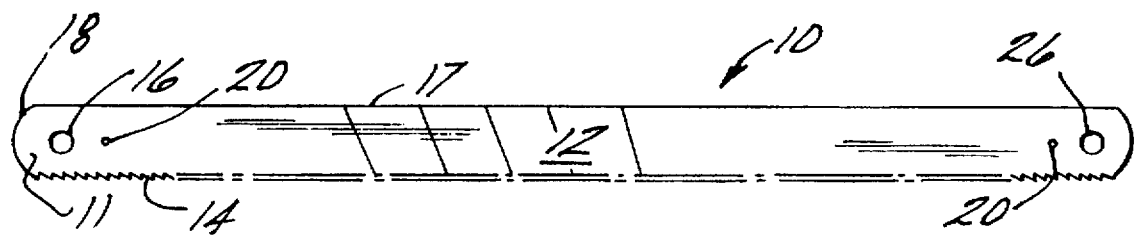
FIG. 4 is an illustration of the scored shearability structure of the invention.

Referring to FIG. 2 one can easily understand the preferred construction of blade 10 by which each end section of 3 to 4 inches may be sheared. Clear to one of skill in the art is that several ways exist for the shearing process, however, the most preferred due to expense and retained rigidity of the main hacksaw blade, is for the end user to simply cut the blade at the desired location with a snip-tool. It is also, however, a possibility to score 30 the surface of the blade in a predetermined pattern and allow the user to simply snap off the end section to the desired length (FIG. 4). This is effective and provides for easier reconfiguration of the blade, however, this is at the expense of torsional rigidity and strength of the blade in its first utility as a hacksaw blade. Since the width of a blade 10 is about one-half inch, which is the same width as the shank of a standard reciprocating saw blade, the invention reliably provides one preferred additional blade having teeth which will extend toward the reciprocating saw (FIG. 3) and one less preferred additional blade (not shown, but which is identical to FIG. 3 except for tooth direction) with teeth extending in the opposite direction from an otherwise standard reciprocating saw blade. Moreover, as an additional advantage, the ½ inch body of the blade is capable of sawing smaller radius curves than the ¾ inch wide blades generally commercially sold for reciprocating saws.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A dual utility blade comprising:
   a) an elongated blade having two elongated edges one of which being adapted to cut an object and two longitudinal ends said blade including a structure adapted to facilitate shearing of said blade in predetermined locations and at predetermined angles;
   b) at least two apertures disposed in predetermined locations and being substantially longitudinally oriented on at least one of the two longitudinal ends of said blade and at least one aperture on the other of the two longitudinal ends of said blade.

2. A dual utility blade as claimed in claim 1 wherein said blade is about eight to about fourteen inches in length.

3. A dual utility blade as claimed in claim 1 wherein said blade is adapted to cut metal.

4. A dual utility blade as claimed in claim 1 wherein said blade is a hacksaw blade.

5. A dual utility blade as claimed in claim 1 wherein said edge adapted to cut said object is so adapted for substantially an entirety of the length of said edge.

6. A dual utility blade as claimed in claim 1 wherein said at least two apertures include a first aperture having a diameter of about $5/32$ inch and a second aperture having a diameter in the range of about 0.042 to about 0.063 inch.

7. A dual utility blade as claimed in claim 6 wherein said first aperture is located about $15/64$ inch from one of said two longitudinal ends of the blade measured to center of the first aperture and about $15/64$ inch from the edge adapted to cut measured perpendicularly therefrom and to an edge of said first aperture and wherein said second aperture is located about $31/64$ inch from the same longitudinal end measured to center of said second aperture and ¼ inch from the edge adapted to cut measured to center of said second aperture.

8. A cutting device comprising:
   a) an elongated blade having two elongated edges one of which being adapted to cut an object;
   b) at least two apertures disposed in predetermined locations and being substantially longitudinally oriented on each of two longitudinal ends of said blade;
   c) a predetermined shearability structure adapted to facilitate shearing the blade at one or more of a plurality of predetermined locations and angles.

9. A method for providing dual utility for a conventional hacksaw blade comprising the steps of:
   a) providing a hacksaw blade having two first apertures one located on each end thereof;
   b) enlarging one of said first apertures;
   c) providing a second aperture in a predetermined position relative to said enlarged aperture;
   d) shearing said hacksaw blade at a desired angle and distance from said enlarged aperture.

10. A method for providing dual utility for a conventional hacksaw blade as claimed in claim 9 wherein said blade includes teeth, said step of enlarging one of said first apertures being carried out subsequent to determining which end of said blade includes teeth extending theretoward and enlarging the first aperture on that end.

11. A method for providing dual utility for a blade comprising the steps of:
   a) providing an elongated blade having two elongated edges one of which being adapted to cut an object and two longitudinal ends said blade having at least two apertures disposed in predetermined locations and being substantially longitudinally oriented on at least one of the two longitudinal ends of said blade and at least one aperture on the other of the two longitudinal ends of said blade;
   b) enlarging said two apertures;
   c) cutting said blade at a desired location and angle.

12. A method for providing dual utility for a blade as claimed in claim 11 wherein said enlarging step comprises enlarging a first of said two apertures from about $5/32$ inch diameter to in the range of about $13/64$ to about $15/64$ inch diameter and a second of said two apertures from in the range of about 0.042 to about 0.063 inch diameter to in the range of about $9/64$ to about $11/64$ inch diameter.

13. A method for providing dual utility for a blade as claimed in claim 12 wherein said first aperture is about $7/32$ inch diameter and said second aperture is about $5/32$ inch diameter.

14. A method for providing dual utility for a conventional hacksaw blade comprising the steps of:
   a) providing a hacksaw blade having two first apertures one located on each end thereof and creating a second aperture substantially adjacent at least one of said first apertures;
   b) enlarging one of said first apertures adjacent said at least one second aperture;
   c) enlarging said at least one second aperture adjacent the enlarged said first aperture;
   d) shearing said hacksaw blade at a desired angle and distance from said enlarged first and second apertures.

15. A method as claimed in claim 14 wherein said second aperture is positioned adjacent the first aperture toward which teeth on the blade extend.

* * * * *